United States Patent
Eloul et al.

(10) Patent No.: US 11,853,278 B2
(45) Date of Patent: Dec. 26, 2023

(54) SYSTEMS AND METHODS FOR COMBINING GRAPH EMBEDDING AND RANDOM FOREST CLASSIFICATION FOR IMPROVING CLASSIFICATION OF DISTRIBUTED LEDGER ACTIVITIES

(71) Applicant: JPMORGAN CHASE BANK, N.A., New York, NY (US)

(72) Inventors: Shaltiel Eloul, London (GB); Sean Moran, London (GB); Jacob Mendel, Givat Brenner (IL)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/657,051

(22) Filed: Mar. 29, 2022

(65) Prior Publication Data
US 2022/0398233 A1 Dec. 15, 2022

Related U.S. Application Data

(60) Provisional application No. 63/209,323, filed on Jun. 10, 2021.

(51) Int. Cl.
*G06F 16/22* (2019.01)
*G06F 16/27* (2019.01)
(Continued)

(52) U.S. Cl.
CPC .............. *G06F 16/22* (2019.01); *G06F 16/27* (2019.01); *G06F 16/285* (2019.01); *G06N 3/04* (2013.01)

(58) Field of Classification Search
CPC ...... G06F 16/22; G06F 16/273; G06F 16/275; G06F 16/278; G06F 16/27
See application file for complete search history.

(56) References Cited

U.S. PATENT DOCUMENTS

11,631,145 B2 * 4/2023 Celia ................. G06Q 30/0201
705/4
2017/0147788 A1 * 5/2017 Ohnemus ............... G16H 40/67
(Continued)

*Primary Examiner* — Merilyn P Nguyen
(74) *Attorney, Agent, or Firm* — GREENBERG TRAURIG LLP (57) ABSTRACT

A method for combining an embedding of a graph having a plurality of nodes and edge connections and classifications of distributed ledger-based activities may include: receiving information for historical distributed ledger-based activities comprising identifications of the plurality of nodes in the graph as involved in illicit activities, licit activities, or unknown; applying sampling to sample labels and associated features; training a first classifier based on the plurality of historical distributed ledger-based activities, the node information, and the sample labels; receiving a current distributed ledger-based activity from the distributed ledger network; predicting a classification for the current distributed ledger-based activity using the first classifier; extracting features from the current distributed ledger-based activity; enriching the extracted features based on one or more neighbors of the nodes involved in the current distributed ledger-based activity; reclassifying the current distributed ledger-based activity using a second classifier; and outputting an alert based on the prediction.

20 Claims, 4 Drawing Sheets

(51) Int. Cl.
*G06F 16/28* (2019.01)
*G06N 3/04* (2023.01)

(56) References Cited

U.S. PATENT DOCUMENTS

| | | | |
|---|---|---|---|
| 2018/0344215 A1* | 12/2018 | Ohnemus | A61B 5/1118 |
| 2019/0339688 A1* | 11/2019 | Celia | H04L 1/18 |
| 2019/0363959 A1* | 11/2019 | Rice | H04L 67/306 |
| 2021/0073913 A1 | 3/2021 | Ingargiola | |
| 2022/0067752 A1 | 3/2022 | Fang et al. | |
| 2022/0198471 A1 | 6/2022 | Silva et al. | |
| 2022/0398573 A1 | 12/2022 | Robinson et al. | |
| 2023/0083724 A1* | 3/2023 | Cella | G06F 16/2455 |
| | | | 705/28 |
| 2023/0120318 A1* | 4/2023 | Marinkovich | G05D 1/0246 |
| | | | 382/155 |

* cited by examiner

SYSTEMS AND METHODS FOR COMBINING GRAPH EMBEDDING AND RANDOM FOREST CLASSIFICATION FOR IMPROVING CLASSIFICATION OF DISTRIBUTED LEDGER ACTIVITIES

RELATED APPLICATIONS

This application claims priority to, and the benefit of, U.S. Provisional Patent Application Ser. No. 63/209,323, filed Jun. 10, 2021, the disclosure of which is hereby incorporated, by reference, in its entirety.

BACKGROUND OF THE INVENTION

1. Field of the Invention

Embodiments relate to systems and methods for combining graph embedding and random forest classification for improving classification of distributed ledger activities.

2. Description of the Related Art

Cryptocurrency and digital currency transactions have been increasing over the past decade. Due to the anonymous nature of some ledgers, cryptocurrency can also be a central route for non-legitimate activities, such as blackmails, money laundering, darknet trades, fraud, and terror funding. This poses a great challenge to public digital currency ledgers being fully trusted.

In recent years, efforts have been devoted to build artificial intelligence-based mechanisms to classify organized activities and detect illicit transactions. For example, machine learning algorithms based on Random Forest, XGBoost, and neural network models such as Graph Convolutional Network ("GCN") model may use transactions as nodes, connections, and features on a blockchain network, embedded as a layer in a deep neural network architecture. The Random Forest and GCN model application for BitCoin activity classification is described in the article, T. N. Kipf et al., "Semi-Supervised Classification With Graph Convolutional Networks," arXiv:1609.02907 (2016), the disclosure of which is hereby incorporated, by reference, in its entirety. A comprehensive study in M. Weber, et al., "Anti-Money Laundering In Bitcoin: Experimenting With Graph Convolutional Networks For Financial Forensics," arXiv: 1908.02591 (2019), the disclosure of which is hereby incorporated, by reference, in its entirety, reported an illicit transaction detection rate of between 72% and 75% for various variations on neural-network (NN) architecture using GCN layers.

SUMMARY OF THE INVENTION

Systems and methods for combining graph embedding and random forest classification for improving classification of distributed ledger activities are disclosed. According to one embodiment, a method for combining an embedding of a graph having a plurality of nodes and edges connections and classifications of distributed ledger-based activities may include: (1) receiving, at a detection computer program executed by a server and from a distributed ledger network, information for a plurality of historical distributed ledger-based activities comprising an identification of the plurality of nodes in the graph as involved in illicit historical distributed ledger-based activities, as being involved in licit historical distributed ledger-based activities, or unknown; (2) applying, by the detection computer program, sampling to sample labels and associated features; (3) training, by the detection computer program, a first classifier based on the plurality of historical distributed ledger-based activities, the node information, and the sample labels; (4) receiving, by the detection computer program, a current distributed ledger-based activity from the distributed ledger network; (5) predicting, by the detection computer program, a classification for the current distributed ledger-based activity using the first classifier; (6) extracting, by the detection computer program, features from the current distributed ledger-based activity; (7) enriching, by the detection computer program, the extracted features based on one or more neighbors of the nodes involved in the current distributed ledger-based activity; (8) reclassifying, by the detection computer program, the current distributed ledger-based activity using a second classifier; and (9) outputting, by the detection computer program, an alert based on the prediction.

In one embodiment, the first classifier may include a random forest classifier, an XGBoost classifier, a linear regression classifier, and/or a neural network classifier.

In one embodiment, wherein for each historical distributed ledger-based activity, the information may include a plurality of nodes involved in the historical distributed ledger-based activity, an amount of the historical distributed ledger-based activity, a number of parties to the historical distributed ledger-based activity, a block number, a time zone, an index, and a value of a currency for the historical distributed ledger-based activity, a volume of the historical distributed ledger activity, an input to the historical distributed ledger activity, and an output of the historical distributed ledger activity, etc.

In one embodiment, the trained classifier may generate enriched features for the distributed ledger activity based on a neighborhood of the nodes in the current distributed ledger-based activity.

In one embodiment, the enriched features may include a count of illicit distributed ledger-based activities and licit distributed ledger-based activities on neighboring nodes.

In one embodiment, the method may also include generating, by the detection computer program, a final classification using a second stage classifier comprising a random forest classifier, an XGBoost classifier, a linear regression classifier, and/or a neural network classifier.

In one embodiment, the second classifier may output a binary prediction or a probability.

In one embodiment, the method may also include causing, by the detection computer program, the current distributed ledger-based activity predicted to be illicit to be stopped.

According to another embodiment, a system may include an electronic device executing a detection computer program, a distributed ledger network, and a database. The detection computer program may receive information for a plurality of historical distributed ledger-based activities from the distributed ledger network; may receive, from a database, information for a historical distributed ledger-based activities comprising an identification of a plurality of nodes in a graph as involved in illicit historical distributed ledger-based activities, as being involved in licit historical distributed ledger-based activities, or unknown; may apply sampling to sample labels and associated features; may train a first classifier based on the plurality of historical distributed ledger-based activities, the node information, and the sample labels; may receive a current distributed ledger-based activity from the distributed ledger network; may predict a classification for the current distributed ledger-based activity using the first classifier; may extract features from the current distributed ledger-based activity; may enrich the extracted features based on one or more neighbors of the nodes involved in the current distributed ledger-based activity; may reclassify the current distributed ledger-based activity using a second classifier; and may output an alert based on the prediction.

In one embodiment, the first classifier may include a random forest classifier, an XGBoost classifier, a linear regression classifier, and/or a neural network classifier.

In one embodiment, wherein for each historical distributed ledger-based activity, the information may include a plurality of nodes involved in the historical distributed ledger-based activity, an amount of the historical distributed ledger-based activity, a number of parties to the historical distributed ledger-based activity, a block number, a time zone, an index, and a value of a currency for the historical distributed ledger-based activity, a volume of the historical distributed ledger activity, an input to the historical distributed ledger activity, and an output of the historical distributed ledger activity, etc.

In one embodiment, the trained classifier may generate enriched features for the distributed ledger activity based on a neighborhood of the nodes in the current distributed ledger-based activity.

In one embodiment, the enriched features may include a count of illicit distributed ledger-based activities and licit distributed ledger-based activities on neighboring nodes.

In one embodiment, the detection computer program may generate a final classification using a second stage classifier comprising a random forest classifier, an XGBoost classifier, a linear regression classifier, and/or a neural network classifier.

In one embodiment, the second classifier may output a binary prediction or a probability.

In one embodiment, the detection computer program may cause the current distributed ledger-based activity predicted to be illicit to be stopped.

Embodiments may include a method for sampling a training set to improve detection of supervised model of illicit transactions in cryptocurrency blockchains. Embodiments may use limited data for training based on sampling of the training dataset. Embodiments may facilitate testing of the classification model on some or all timesteps of the-dataset, thereby providing more objective testing.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are directed to systems and methods for combining graph embedding and random forest classification for improving classification of distributed ledger activities.

Cryptocurrency networks are dynamic networks and are affected by events. For instance, the shutdown of a major "darknet" operation will cause a reorganization of the illicit communications on the cryptocurrency network or Random Forest classifier, and as a result, known detection techniques generally do not perform well. Thus, embodiments adapt to changes in the network to classify distributed ledger-based activities.

For example, embodiments may combine a Random Forest/XGBoost or GCN to provide classification.

Embodiments may provide at least some of the following technical advantages: (1) the use of a machine learning classifier, that embeds or incorporates a graph of distributed ledger-based activity information (also known as Graph Embedding) and, with a classifier that uses this embedding, enables the detection of illicit distributed ledger-based activity in real-time of the digital currency and (2) the use of an adaptable fraud detection algorithm that may be used with various graph-based neural network architectures. Embodiments may have applicability in a variety of industries, including banking, insurance, legal, hedge funds, exchanges, etc.

Figure 1:
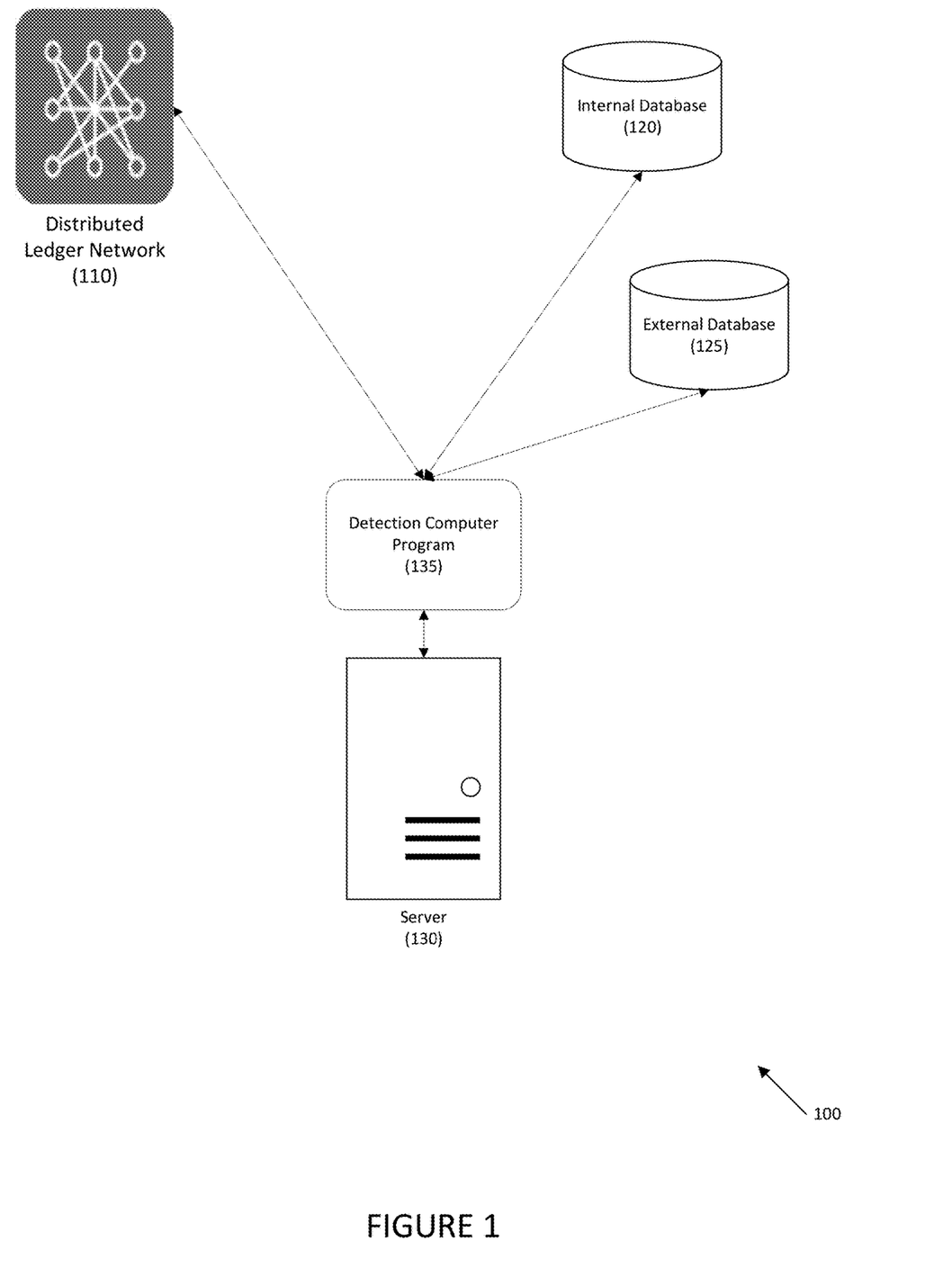
FIG. 1 illustrates a diagram for combining graph embedding and random forest classification for improving classification of distributed ledger activities according to one embodiment.

Referring to FIG. 1, a system for combining graph embedding and random forest classification for improving classification of distributed ledger activities is disclosed according to one embodiment. System 100 may include distributed ledger network 110, which may be any suitable distributed ledger network. In one embodiment, distributed ledger network 110 may support a cryptocurrency that provides anonymity, such as Bitcoin.

In one embodiment, distributed ledger network 110 may be represented as a graph that includes a plurality of nodes that are connected by edges. In one embodiment, the nodes may represent parties to a distributed ledger-based activity, such as a transaction, and the edges may represent the distributed ledger activity between two nodes.

Server 130 may execute detection computer program 135. Server 130 may be any suitable server, including physical servers, cloud-based servers, combinations, etc. Detection computer program 135 may receive current transaction data from distributed ledger network 110 and may identify distributed ledger-based activity details, such as the nodes involved in the activity, and may use data from internal database 120 to assign each node as being involved in a licit or an illicit distributed ledger-based activity. For example, internal database 120 may be associated with a financial institution or other trusted entity, and a detection computer program may identify distributed ledger-based activities from such nodes as licit.

In one embodiment, detection computer program 135 may further receive information on nodes from external database 125. External database 125 may be provided by a third party and may identity nodes that may be associated with illicit distributed ledger-based activities. External database 125 may further identify the nodes involved in licit distributed ledger-based activities.

In one embodiment, in a private domain blockchain, or in a public blockchain that there is control on the validation of distributed ledger-based activity contracts, the detection computer program may stop a distributed ledger-based activity from happening. In existing public blockchains, such as BitCoin or Ethereum, the illicit addresses may be identified, tracked, and reported so that future distributed ledger-based activities with these addresses can be avoided.

Figure 2:
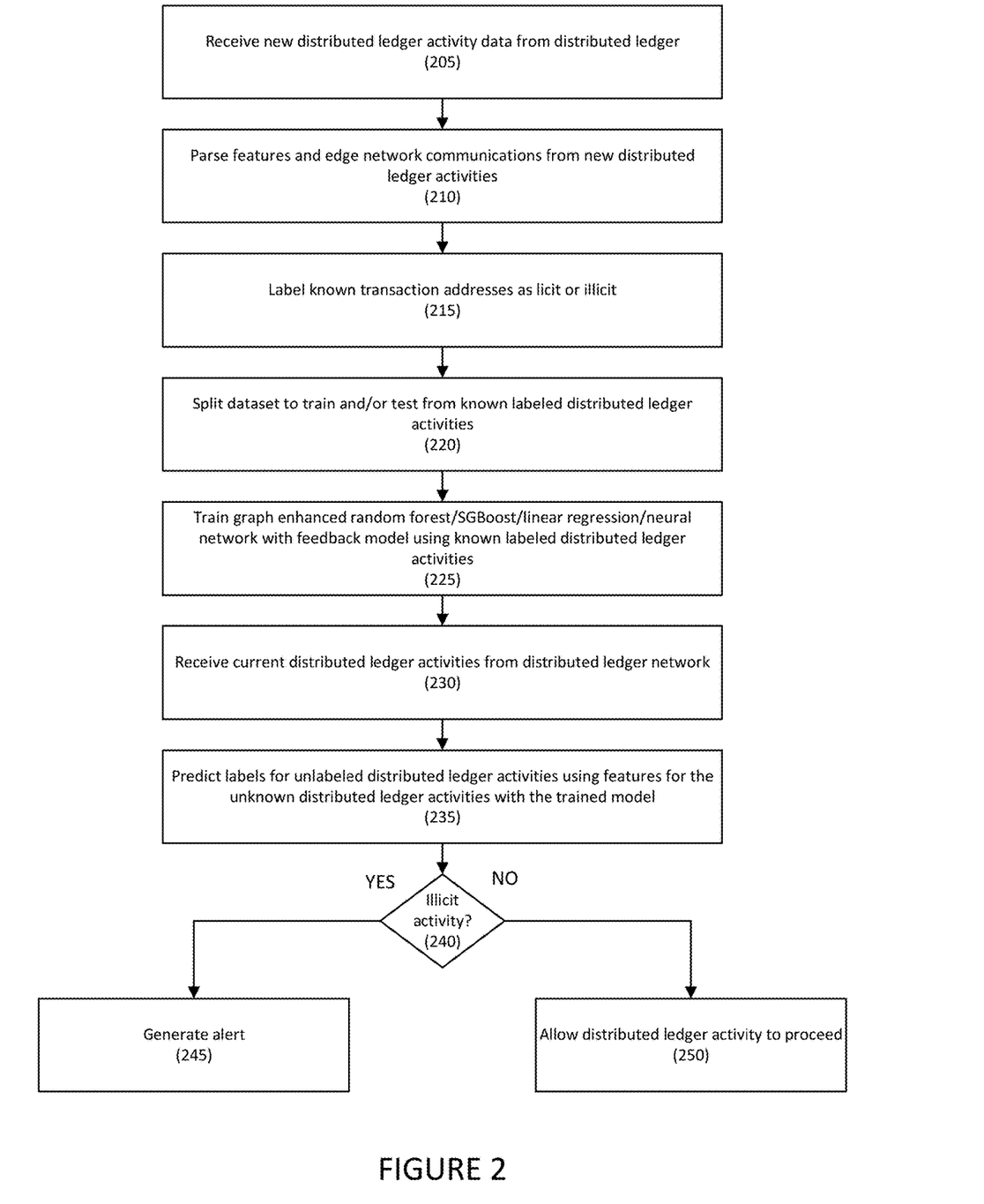
FIG. 2 depicts a method for training and inferring using graph embedding and random forest classification for improving classification of distributed ledger according to one embodiment.

Referring to FIG. 2, a method for combining graph embedding and random forest classification for improving classification of distributed ledger activities is disclosed according to one embodiment.

In step 205, a detection computer program executed by a server may receive new distributed ledger-based activity data, such as transaction data, from a distributed ledger network. For example, the distributed ledger network may provide the detection computer program with information such as the nodes (e.g., addresses) involved in the new distributed ledger-based activity, the amount of the new distributed ledger-based activity, the number of parties in the new distributed ledger-based activity, the time zone of the new distributed ledger-based activity, etc. Any other suitable information including block number, index and value of the currency, current volume of the market, etc. may be received as is necessary and/or desired.

In step 210, the detection computer program may parse features and edge network communications from the new distributed ledger activities. The features are extracted from the raw information of the transaction public details. These can be the rate, time stamp, blocknumber, number of input/outputs, volume, etc.

In step 215, the detection computer program may label known distributed ledger addresses, or nodes. For example, the detection computer program may receive node information from, for example, internal databases and external databases. The databases may identify/label nodes as known as being involved in licit distributed ledger-based activities, or illicit distributed ledger-based activities, or as unknown. The aim of a classifier is to classify unknown or new distributed ledger-based activities.

In one embodiment, steps 205, 210, and 215 may be performed in parallel, in any order, etc.

In step 220, the detection computer program may split the database to train and/or test from known labeled distributed ledger-based activities. For example, the detection computer program may use exponential sampling. Exponential sampling defines the size of the test and train sets as follows:

$$N_{x_{test}}(t) = (1-\theta)N_{xtrain}(t)$$

$$N_{x_{train}}(i) = \theta(i)x_t$$

The exponential decay for the training set can be defined by uniformly sampling $N_{x_{train}}(i)$ for each i:

$$\theta(i) = \begin{cases} \theta_t, & i = t \\ \theta(i-1)^a, & i < t \end{cases}$$

where a is optimized for each type of exponential batch, and $\theta_t$ may determine the fraction at the current time for the size of the training set.

In step 225, the detection computer program may train a graph-enhanced random forest/XGBoost/Linear Regression/Neural network with feedback model. For example, referring to FIG. 3, a method for training a graph-enhanced random forest with feedback model is provided according to an embodiment.

Figure 3:
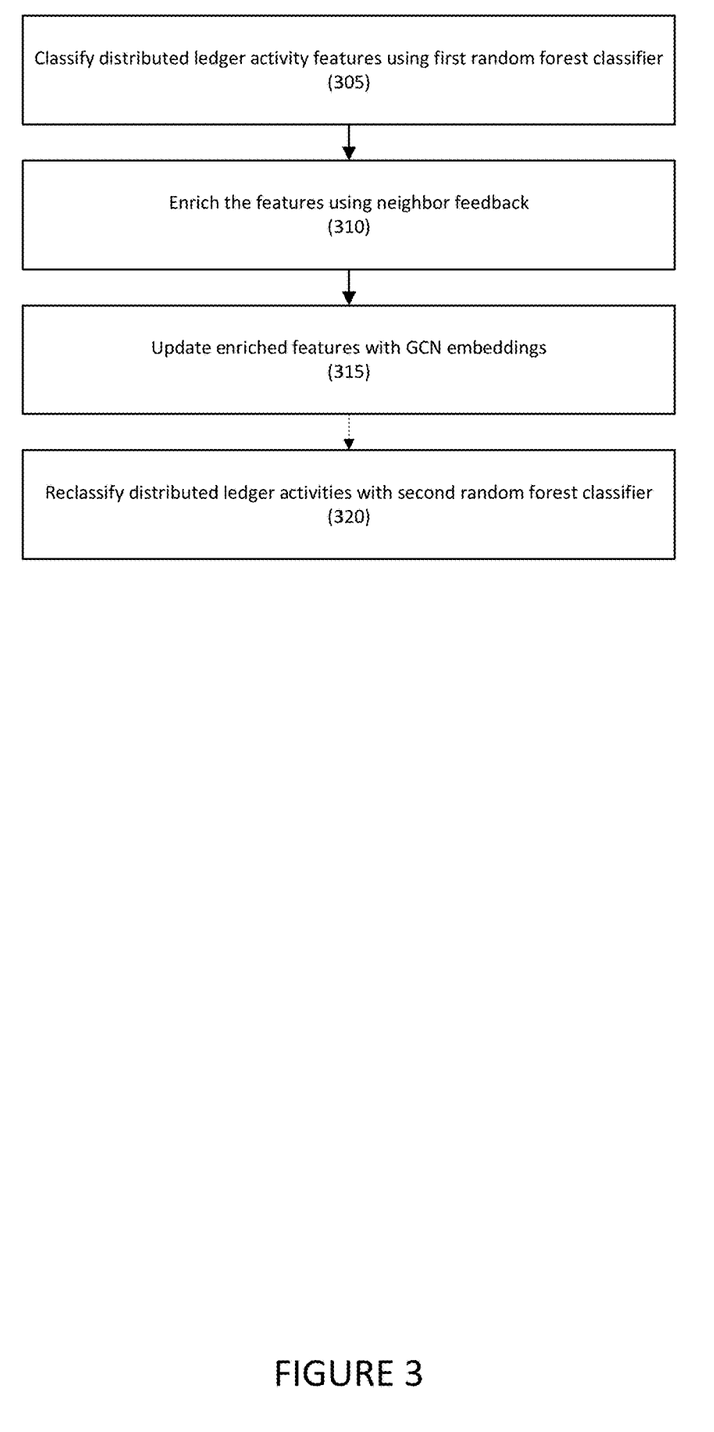
FIG. 3 depicts a classifier method for graph-enhanced random forest with feedback model according to one embodiment.

In step 305, detection computer program may classify distributed ledger-based activities based on extracted features using a first random forest classifier.

In step 310, the detection computer program may enrich the features using, for example, neighbor feedback. In one embodiment, the neighbor feedback may be in any suitable order, such as first order neighbor nodes, second order neighbor nodes, etc. as is necessary and/or desired.

Figure 4:
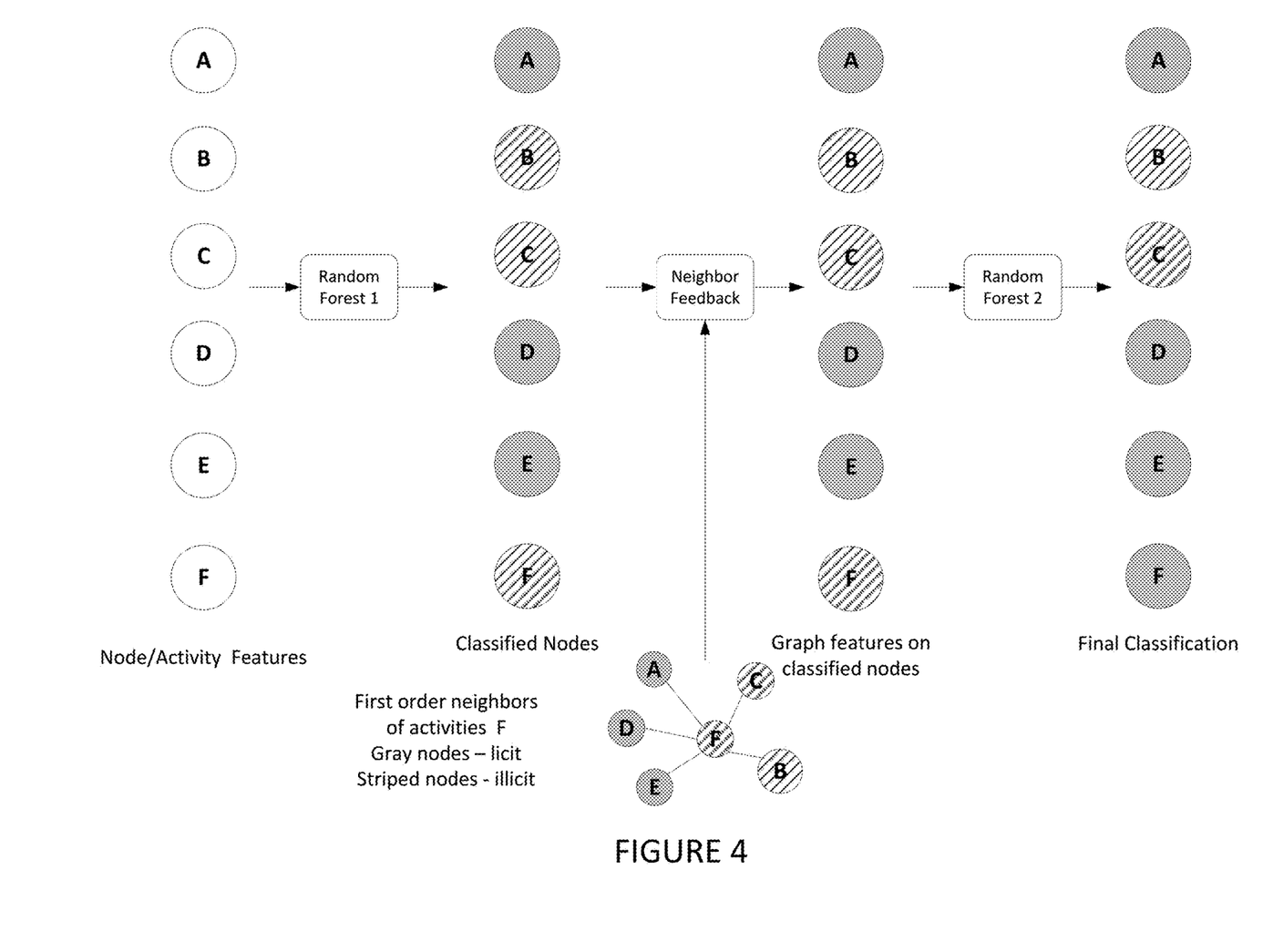
FIG. 4 illustrates an example of enrichment with neighbor feedback according to an embodiment.

In one embodiment, the enrichment with the neighbor feedback may be done by counting the number of labels found in first stage classification (i.e., the distribution of labels found for neighbors), and adding the counts as new features for the second stage of the classifier. An example of such enrichment is illustrated in FIG. 4.

Additional features may be added as is necessary and/or desired. In embodiments, the number of features added may depend on the number of labels and the number of degrees of neighbors that are considered.

In step 315, the enriched features may be updated with GCN embeddings.

In step 320, the detection computer program may classify current (new) distributed ledger-based activities using the features of the distributed ledger-based activities and by including the graph enriched features with using a second random forest classifier or other type of classifier (XGBoost/Linear Regression/neural network).

Next, the loss over the training set, which contains labelled illicit/licit nodes, may be calculated. The loss weights of illicit/licit label loss may be optimized to compensate for the imbalance of the licit/illicit ratio. For the result, a dataset may contain illicit and non-illicit distributed ledger-based activities as the temporal populations of the labels.

Referring again to FIG. 2, in step 230, the detection computer program may receive current distributed ledger-based activity data for one or more distributed ledger-based activities from the distributed ledger network. In one embodiment, a node on the distributed ledger network may provide the current distributed ledger-based activities to the detection computer program. The information received may be similar to the information received in step 205, including, for example, the nodes involved in the current (new) distributed ledger-based activity, the amount of the current distributed ledger-based activity, the number of parties in the current distributed ledger-based activity, the time zone of the current distributed ledger-based activity, the block number, index and value of the currency, current volume of the market, etc.

In step 235, the detection computer program may predict classifications for the distributed ledger-based activit(ies) using the trained graph-enhanced random forest with feedback classifier.

The detection computer program may predict if a current distributed ledger-based activity is an illicit activity or a licit based activity.

If, in step 240, the current distributed ledger-based activity is predicted to be an illicit activity in step 245, an alert may be generated. For example, in a private blockchain, the current distributed ledger-based activity may be stopped and re-checked manually if desired. The address(es) may be reported and added to a list of denial addresses.

If, in step 240, the current distributed ledger-based activity is predicted to be a licit activity in step 250, the distributed ledger-based activity may proceed.

Although several embodiments have been disclosed, it should be recognized that these embodiments are not exclusive to each other, and certain elements or features from one embodiment may be used with another embodiment.

It will be appreciated by persons skilled in the art that the present invention is not limited by what has been particularly shown and described hereinabove. Rather, the scope of the present invention includes both combinations and sub-combinations of features described hereinabove and variations and modifications thereof which are not in the prior art. It should further be recognized that these embodiments are not exclusive to each other.

It will be readily understood by those persons skilled in the art that the embodiments disclosed here are susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for combining an embedding of a graph having a plurality of nodes and edge connections and classifications of distributed ledger-based activities, comprising:
    receiving, at a detection computer program executed by a server and from a distributed ledger network, information for a plurality of historical distributed ledger-based activities comprising an identification of the plurality of nodes in the graph as involved in illicit historical distributed ledger-based activities, as being involved in licit historical distributed ledger-based activities, or unknown historical distributed ledger-based activities;
    applying, by the detection computer program, sampling to sample labels and associated features;
    training, by the detection computer program, a first classifier based on the plurality of historical distributed ledger-based activities, the node information, and the sample labels;
    receiving, by the detection computer program, a current distributed ledger-based activity from the distributed ledger network;
    predicting, by the detection computer program, a classification for the current distributed ledger-based activity using the first classifier;
    extracting, by the detection computer program, features from the current distributed ledger-based activity;
    enriching, by the detection computer program, the extracted features based on one or more neighbors of the nodes involved in the current distributed ledger-based activity;
    reclassifying, by the detection computer program, the current distributed ledger-based activity using a second classifier; and
    outputting, by the detection computer program, an alert based on the prediction.

2. The method of claim 1, wherein the first classifier comprises a random forest classifier, an XGBoost classifier, a linear regression classifier, and/or a neural network classifier.

3. The method of claim 1, wherein, for each historical distributed ledger-based activity, the information comprises a plurality of nodes involved in the historical distributed ledger-based activity, an amount of the historical distributed ledger-based activity, and a number of parties to the historical distributed ledger-based activity.

4. The method of claim 3, wherein, for each historical distributed ledger-based activity, the information further comprises a block number, a time zone, an index, and a value of a currency for the historical distributed ledger-based activity.

5. The method of claim 4, wherein the information further comprises a volume of the historical distributed ledger activity, an input to the historical distributed ledger activity, and an output of the historical distributed ledger activity.

6. The method of claim 1, wherein the trained classifier generates enriched features for the distributed ledger activity based on a neighborhood of the nodes in the current distributed ledger-based activity.

7. The method of claim 6, wherein the enriched features comprise a count of illicit distributed ledger-based activities and licit distributed ledger-based activities on neighboring nodes.

8. The method of claim 1, further comprising:
    generating, by the detection computer program, a final classification using a second stage classifier comprising a random forest classifier, an XGBoost classifier, a linear regression classifier, and/or a neural network classifier.

9. The method of claim 1, wherein the second classifier outputs a binary prediction or a probability.

10. The method of claim 1, further comprising:
    causing, by the detection computer program, the current distributed ledger-based activity predicted to be illicit to be stopped.

11. A system comprising:
    an electronic device executing a detection computer program;
    a distributed ledger network; and
    a database;
    wherein:
        the detection computer program receives information for a plurality of historical distributed ledger-based activities from the distributed ledger network comprising an identification of a plurality of nodes in a graph as involved in illicit historical distributed ledger-based activities, as being involved in licit historical distributed ledger-based activities, or unknown;
        the detection computer program applies sampling to sample labels and associated features;
        the detection computer program trains a first classifier based on the plurality of historical distributed ledger-based activities, the node information, and the sample labels;
        the detection computer program receives a current distributed ledger-based activity from the distributed ledger network;
        the detection computer program predicts a classification for the current distributed ledger-based activity using the first classifier;
        the detection computer program extracts features from the current distributed ledger-based activity;
        the detection computer program enriches the extracted features based on one or more neighbors of the nodes involved in the current distributed ledger-based activity;
        the detection computer program reclassifies the current distributed ledger-based activity using a second classifier; and the detection computer program outputs an alert based on the prediction.

12. The system of claim 11, wherein the first classifier comprises a random forest classifier, an XGBoost classifier, a linear regression classifier, and/or a neural network classifier.

13. The system of claim 11, wherein, for each distributed ledger-based activity, the information comprises a plurality of nodes involved in the distributed ledger-based activity, an amount of the distributed ledger-based activity, and a number of parties to the distributed ledger-based activity.

14. The system of claim 13, wherein the information further comprises a block number, time zone, and an index and a value of a currency for the distributed ledger-based activity, volume, inputs and outputs numbers and other raw information for the historical distributed ledger-based activity.

15. The system of claim 14, wherein the information further comprises a volume of the historical distributed ledger activity, an input to the historical distributed ledger activity, and an output of the historical distributed ledger activity.

16. The system of claim 11, wherein the trained classifier generates enriched features for the distributed ledger activity based on a neighborhood of the nodes in the current distributed ledger-based activity.

17. The system of claim 16, wherein the enriched features comprise a count of illicit distributed ledger-based activities and licit distributed ledger-based activities on neighboring nodes.

18. The system of claim 11, wherein the detection computer program generates a final classification using a second stage classifier comprising a random forest classifier, an XGBoost classifier, a linear regression classifier, and/or a neural network classifier.

19. The system of claim 11, wherein the second classifier outputs a binary prediction or a probability.

20. The system of claim 11, wherein the detection computer program causes the current distributed ledger-based activity predicted to be illicit to be stopped.

* * * * *